United States Patent [19]
Rosenfeld et al.

[11] Patent Number: 5,856,425
[45] Date of Patent: Jan. 5, 1999

[54] DISPENSABLE RESIN PASTE

[75] Inventors: Jerold C. Rosenfeld; Sergio R. Rojstaczer, both of Amherst, N.Y.

[73] Assignee: Occidental Chemical Corporation, Niagara Falls, N.Y.

[21] Appl. No.: 948,725

[22] Filed: Oct. 10, 1997

[51] Int. Cl.⁶ .............................. C08G 69/44; C08G 73/16
[52] U.S. Cl. .................. 528/289; 156/330.9; 156/331.1; 156/331.5
[58] Field of Search ..................................... 528/288, 289; 156/330.9, 331.1, 331.5

[56] References Cited

U.S. PATENT DOCUMENTS 4,393,188  7/1983  Takahashi et al. .......................... 528/88

OTHER PUBLICATIONS

"Reactions of Diamionoalkanes with Bismaleimides: Synthesis of Some Unusual Polyimides", Jerry E. White et al., Journal of Applied Polymer Science, vol. 29, pp. 891 to 899 (1984).

*Primary Examiner*—Nathan M. Nutter
*Attorney, Agent, or Firm*—Richard D. Fuerle; Anne E. Brookes

[57] ABSTRACT

Disclosed is a resin paste made from a maleimide having at least two maleimide groups and a liquid diamine. The paste can optionally contain fillers, thickeners, defoamers, coupling agents, and solid epoxies. The resin paste has a long pot life and a short cure time and is dispensable through a syringe.

20 Claims, No Drawings

DISPENSABLE RESIN PASTE

BACKGROUND OF THE INVENTION

This invention relates to a resinous paste that can be dispensed from a syringe and cured with heat to form a coating or an adhesive. In particular, it relates to a resin paste prepared from a maleimide and a liquid diamine.

Fast curing liquid systems are used extensively in the microelectronics industry as adhesives, sealants, and encapsulants. These liquid systems are typically applied to parts moving on an assembly line and therefore they must be able to cure rapidly. A system must also have a pot life at room temperature that is long enough so that over at least one entire working day its viscosity does not increase so much that it can no longer be dispensed. In addition, of course, it must provide good adhesion to various types of materials. High thermal stability at temperatures above 200° C. is also required in order to withstand downstream processes such as wirebonding. Low water adsorption is desirable so that blisters do not form on heating.

At the present time, epoxy resins are often used for these applications. While epoxy resins have good adhesion, they tend to be rigid and often crack and fail on temperature cycling. In addition, they are not re-workable because they do not remelt upon heating.

SUMMARY OF THE INVENTION

We have discovered that a dispensable resin paste which is especially suitable for use in microelectronic applications can be made from a maleimide and a liquid diamine. The resin paste of this invention can be made with a low enough viscosity to be easily dispensed from a syringe for at least a day. The resin paste cures rapidly, typically in less than five minutes at temperatures up to 190° C., and is suitable for assembly line operations. Surprisingly, resin pastes within the scope of this invention do not react at room temperature, resulting in a long pot life and convenient storage conditions. The resin paste also is an excellent adhesive and adheres well to the various materials used in the microelectronics industry. Due to its low modulus, the resin paste is flexible when heated or cooled and can withstand repeated temperature cyclings. The resin paste can be made with low water absorbtivity to prevent blistering upon heating. Unlike epoxy resins, the cured resin paste of this invention can be reworked by heating.

DESCRIPTION OF THE PREFERRED EMBODIMENTS

The resin paste of this invention is made from a liquid diamine and a maleimide having at least two maleimide groups. While any maleimide can be used, solid maleimides are preferred as they are less reactive and therefore the resulting resin paste has a longer pot life. A bismaleimide is a compound having exactly 2 maleimide groups as in the general formula:

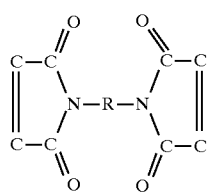

In this general formula, R can be aryl or aliphatic from $C_2$ to $C_{30}$. Preferably, R is aromatic as those compounds are commercially more available. Examples of bismaleimides include compounds where R in the above-given general formula is selected from:

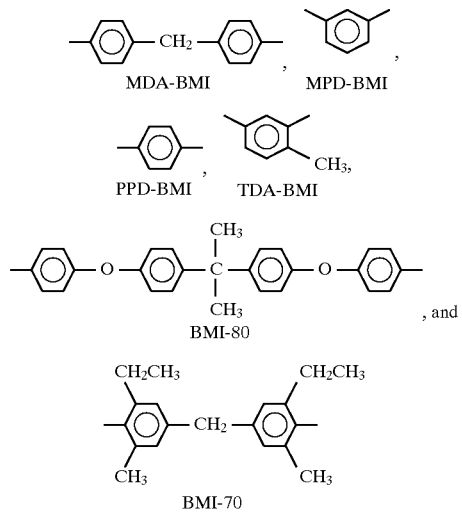

MDA-BMI (methylene dianiline bismaleimide) is available from Ciba-Geigy, as "Matrimid 5292A," MPD-BMI (m-phenylene diamine bismaleimide), PPD-BMI (p-phenylene diamine bismaleimide), and TDA-BMI (toluene diamine bismaleimide) are available from MTC America Chemicals, and BMI-70 (3,3'-diethyl-5,5'-dimethyl methylene dianiline bismaleimide) and BMI-80 (2,2-bis(4 [4-aminophenoxyl]phenyl)propane bismaleimide) are available from Ihara Chemical Industry Company. MPD-BMI is also available from GP Chemicals. The preferred bismaleimide is MPD-BMI because it produces a resin paste with a good pot life, a fast cure, and high adhesion.

An example of a maleimide having more than two maleimide groups is a polymer having the general formula:

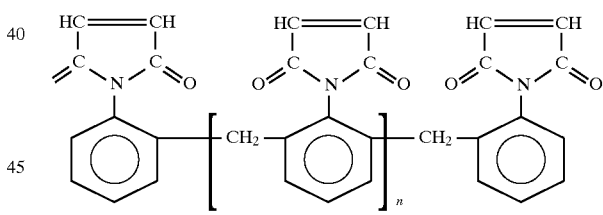

where n is at least 1. This polymer is made by reacting aniline with formaldehyde and is available as an oligomeric mixture (i.e., n=0, 1, 2, ...) from MTC America.

The diamine used to produce the resin paste of this invention must be a liquid at room temperature because a dispensable resin paste cannot be easily made from a solid diamine. The liquid diamine should also have a boiling point of greater than 100° C. so that it does not evaporate prior to curing.

The liquid diamine can be either a siloxane-containing liquid diamine or a non-siloxane-containing diamine, or a mixture of the two. Siloxane diamines reduce the water absorption of the cured resin and increase its low temperature flexibility, while diamines that do not contain siloxane groups are less expensive. For many applications, a mixture of about 10 to 90 mole % siloxane-containing liquid diamine with about 10 to 90 mole % non-siloxane containing diamine is preferred.

The siloxane-containing diamine can have the general formula:

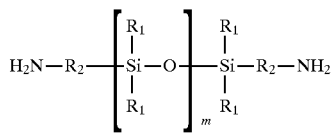

where $R_1$ is alkyl from $C_1$ to $C_4$ or vinyl, $R_2$ is alkylene from $C_1$ to $C_4$, and m is 7 to 200; m is preferably 9 to 50 as those liquid diamines produce a resin paste having a longer pot life. $R_1$ is preferably methyl and $R_2$ is preferably n-propylene as those liquid diamines work well and are readily available. The diamines where $R_1=CH_3$ and $R_2=C_3H_6$ are herein referred to by the designation "$G_m$"; e.g., "$G_9$" means such a diamine where m=9.

The non-siloxane containing liquid diamine should be non-polar or at least less polar than the maleimide in order to reduce the reactivity of the liquid diamine with the maleimide. Thus, "oily" diamines that contain about 20 to about 40 carbon atoms are preferred. An example of a suitable non-siloxane containing liquid diamine is the 36 carbon aliphatic diamine having 2 terminal primary amine groups sold by Henkel Corporation as "Versamine 552."

The liquid diamine reacts with the maleimide according to the reaction:

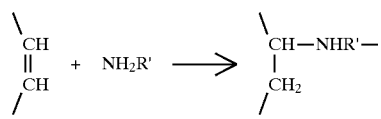

In addition, the secondary amine group formed on the product can react with an additional maleimide group. At higher temperatures, the maleimide groups can also react with themselves. Generally, each amino group on the liquid diamine can react with two unsaturated groups on the maleimide. The molar ratio of maleimide to diamine should be between about 1 and about 3 as at lower molar ratios the molecular weight of the resin paste is low and the physical properties of the cured resin may be lower. At higher molar ratios the viscosity may be too high to dispense the resin paste from a syringe. The preferred molar ratio of maleimide to liquid diamine is about 1 to about 2. In addition to the molar ratio requirement, the weight ratio of liquid diamine to maleimide should be about 1.5 to about 3 in order for the resin paste to have a viscosity that is low enough to be dispensable. Preferably, the weight ratio of liquid diamine to maleimide is at least 2.

The resin paste may contain various optional components such as fillers, thickeners, defoamers, coupling agents, and epoxy and cyanate resins. Up to 80 wt % of the resin paste may consist of a filler and, for certain applications such as die-attachment, the resin paste preferably contains about 70 to about 80 wt % of a filler. A wide variety of different types of fillers can be used for different purposes. For example, silica can be used to increase the rigidity of the cured resin paste, silver powder can be used to increase its heat and/or electrical conductivity, and alumina or aluminum nitride can be used to increase its thermal conductivity.

Up to about 6 wt % of the resin paste may consist of a thickener such as fumed silica. Other thickeners that can be used include various clays and organic polymeric thickeners. If the resin paste is to be used as a sealant, it is preferable to include about 1 to about 5 wt % of a thickener in it.

Up to about 1 wt % of the resin paste may consist of a defoamer, which reduces air bubbles in the cured resin paste. It is preferable to include about 0.1 to about 0.5 wt % of a defoamer. Examples of defoamers include silicone polymers and polypropylene glycol based defoaming agents.

Up to about 5 wt % of the resin paste may consist of a coupling agent to improve the adhesion of the cured resin paste to various substrates and to any fillers that may be present within it, and to give better long-term adhesion. It is preferable to include about 0.1 to about 1 wt % of a coupling agent in the resin paste. Examples of suitable coupling agents include 3-aminopropyltriethoxysilane, 3-aminopropylmethyldiethoxysilane, N-phenyl-3-aminopropyltriethoxysilane, N-(triethoxysilyl-propyl-urea, epoxy silanes such as beta-(3,4-epoxycyclohexyl) ethyltrimethylsiloxane, and methacrylate silanes such as 3-(methacryloxy)propyltrimethoxysilane. The preferred coupling agent is 3-aminopropyltriethoxysilane as it has been found to work well.

Up to about 10 wt % of the resin paste may consist of a solid epoxy for the purpose of improving the adhesion of the resin paste. It is preferable to include about 1 to about 5 wt % of a solid epoxy in the resin paste. Examples of solid epoxies include triglycidyl isocyanurate, epoxy cresol novolaks, and N,N,N',N'-tetraglycidyl-4,4'-methylene bis-benzenamine.

The resin paste of this invention can be used to bond surfaces together, to seal parts, to encapsulate parts, or for other applications. The resin paste is applied to a surface, typically through a syringe, though it can also be applied in other ways, such as by screen printing. If used as an adhesive, another surface is placed over the dispensed resin paste. The resin paste is then cured. A curing temperature of about 150° to about 190° C. for up to about 10 minutes, depending upon the particular resin paste formulation, is usually adequate.

The following examples further illustrate this invention. In evaluating the results of these experiments one should consider that a resin paste dispensable from a syringe that is suitable for use in microelectronic applications should have a pot life of at least 12 hours. That can be interpreted to mean that its viscosity should not increase more than 50% in a 12-hour period. It should cure rapidly in less than 5 minutes at a temperature under 200° C., and, to be dispensable from a syringe, it should have a viscosity of less than 20,000 centipoises. It should have good adhesion to alloy 42, copper, ceramics, silicon chips, and other materials used in the microelectronics industry, which means that its die sheer strength should be greater than 10 kgs for a 4 $cm^2$ die. It should have a low modulus so that it is flexible and is not stressed when heated or cooled.

EXAMPLES 1 TO 16

Two samples of mixtures of various diamines and bismaleimides were prepared and placed in vials. One vial was observed to determine pot life at room temperature and the second vial was heated to determine gel time. The results are given in the following table. (Amounts given in grams.)

| Bismaleimide | Mw | mp (°C.) | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|---|
| MDA-BMI | 330 | 160 | 0.370 | | | | | 0.370 | 0.370 | 0.370 | | | | | | | | |
| MPD-BMI | 268 | 206 | | 0.300 | 0.451 | | | | | | 0.300 | 0.450 | 0.300 | 0.456 | 0.301 | 0.901 | 0.602 | 1.201 |
| BMI-80 | 570 | 159 | | | | 0.640 | | | | | | | | | | | | |
| BMI-70 | 414 | 170 | | | | | 0.464 | | | | | | | | | | | |
| Diamines | | | | | | | | | | | | | | | | | | |
| $G_9$ | 841 | | 0.952 | 0.945 | 0.953 | 0.947 | 0.942 | | | | | | | | | | | |
| $G_{12}$ | 1127 | | | | | | | 1.262 | | | | | | | | | | |
| $G_{25}$ | 1917 | | | | | | | | 2.149 | | | | | | | | | |
| $G_{50}$ | 3750 | | | | | | | | | 4.20 | | | | | | | | |
| $G_5$ | 546 | | | | | | | | | | 0.610 | 0.617 | | | | | | |
| $G_1$ | 248 | | | | | | | | | | | | 0.288 | | | | | |
| Versamine 552 | 555 | | | | | | | | | | | | | 0.76 | 0.641 | 1.26 | | |
| Dytek A(1) | 116 | | | | | | | | | | | | | | | | | 0.545 |
| m-xylylene diamine(2) | 136 | | | | | | | | | | | | | | | | 0.303 | |
| Mole Ratio (BMI/diamine) | | | 1/1 | 1/1 | 1.5/1 | 1/1 | 1/1 | 1/1 | 1/1 | 1/1 | 1/1 | 1.5/1 | 1/1 | 1.24/1 | 1/1 | 1.5/1 | 1/1 | 1/1 |
| Approx. Pot Life at room temp. (Days, etc.) | | | <1 about 3 hrs | >2 | >2 | About 2 | <1 About 3 hrs | <1 | 1+ | >2 | <1 | <1 | <<1 Started curing after mix | >2 | About 2 | >2 | <<1 Reacted immediately | <<1 Reacted immediately |
| Gel Time (seconds) at Temp (°C.) | | | 20 sec 190° C. | 23 sec 214° C. | 21 sec 200° C. | | | 35 sec 195° C. | 60 sec 195° C. | 90 sec 190° C. | 15 sec 194° C. | 15 sec 194° C. | — | 15 sec 194° C. | — | | | |

(1)A 6-carbon branched aliphatic diamine sold by Dupont.
(2)Purchased from Aldrich.

The above table shows that resin pastes made from MPD-BMI and BMI-80 had a much better pot life than did resin pastes made from MDA-BMI and BMI-70. The MPD-BMI-$G_9$ system also cured rapidly as shown by its short gel time. Examples 1, 6, 7, and 8 show that the pot life can be extended by using high molecular weight siloxane-containing diamines. The cure rate (gel time) is slightly slower but it is still fairly rapid. $G_{100}$ was also tried (molecular weight=7590) and gave a very good pot life, but its gel time was increased to about 6 minutes. MPD-BMI gave a good pot life with $G_9$, but when MPD-BMI was used with $G_5$ (in experiments 9 and 10) and $G_1$ (experiment 11) the pot life fell to less than a day. In experiment 9 the mixture warmed slightly after mixing, became very viscous in less than an hour, and was hard after about 4 hours at room temperature. The mixtures from experiments 10 and 11 became very viscous after about 4 hours at room temperature. The Dytek-A and the xylene diamine reacted as soon as they were added to the bismaleimide.

EXAMPLES 17 TO 21

Silver-filled resin pastes were prepared by charging a liquid diamine to a small plastic wide-mouthed jar. A bismaleimide was added followed by 1 wt % (based on paste weight) of a silicone defoamer sold by Dow Corning as "DC-1400," and the mixture was stirred. Finally, 75 wt % (based on total paste weight) silver flake was added. The mixture was stirred with a spatula and milled on a 1 Ross, 3-roll mill at a speed of about 20 rpm usually for about 2 passes. The viscosity of the paste was measured at 25° C. using a cone and plate Brookfield viscometer. Die sheer tests were done on a HMP Soldermatics Model 1750 die sheer test tester. Samples were prepared for testing by putting a small amount of paste on a flat piece (about 2.54 by 5.08 cm (about 1 by 2 inches)) of alloy 42 and placing a small piece of polyimide coated silicon wafer (approximately 1.6 cm$^2$ (0.25 square inches)) on top of the paste and then curing on a hotplate. The following table gives the results.

| Example | 17 | 18 | 19 | 20 | 21 |
|---|---|---|---|---|---|
| Bismaleimide | MPD | BAPP(BMI-80) | MPD | MPD | MPD |
| $G_m$ | $G_9$ | $G_9$ | $G_6$ | $G_6$ | Versamine 552 |
| Mole Ratio (BMI/$G_m$) | 1.5/1 | 1.25/1 | 1.5/1 | 1.0/1 | 1.0/1 |
| Viscosity (cps) 5 rpm | | | | | |
| After milling | 12,660 | 188,330/1 rpm | off scale (too stiff) | 150,600/1 rpm 255,900/0.5 rpm | 21,600 |
| After 10–12 hrs at room temp | 12420 | | | off scale 68,100/2.5 rpm 183,200/0.5 rpm | |

-continued

| Example | 17 | 18 | 19 | 20 | 21 |
|---|---|---|---|---|---|
| Die Sheer Strength (kg) Cured 60 sec t 190° C. (measured at room-temp) Cured 1 min at 90° C. then up to 190° C. over 12 min | 8.0 | 17.7 | 13.3 | 18.3 | 2.0 |
| a) measured at room temp | 19.8 | 21.0 | 23.5 | 25.0 | 23.8 |
| b) measured at 190° C. | 3.0 | 4.3 | 4.5 | 11.0 | 7.0 |

The above table shows that bismaleimide-diamine silver pastes can be prepared which have viscosities in the useful range, rapid cure rates, good shelf lives, and good adhesion.

We claim:

1. A resin paste comprising (A) a maleimide having at least two maleimide groups;

(B) liquid aliphatic primary diamine having a boiling point greater than 100° C., where the molar ratio of said maleimide to said diamine is about 1 to about 3 and the weight ratio of said diamine to said maleimide is about 1.5 to about 3;

(C) up to about 80 wt % of a filler;

(D) up to about 6 wt % of a thickener;

(E) up to about 1 wt % of a defoamer;

(F) up to about 5 wt % of a coupling agent; and (G) up to about 10 wt % of a solid epoxy.

2. A resin paste according to claim 1 wherein said maleimide is a solid.

3. A resin paste according to claim 3 wherein said maleimide has the general formula:

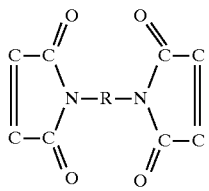

where R is aryl or aliphatic from $C_2$ to $C_{30}$.

4. A resin paste according to claim 3 wherein R is aromatic.

5. A resin paste according to claim 1 wherein said maleimide has the general formula:

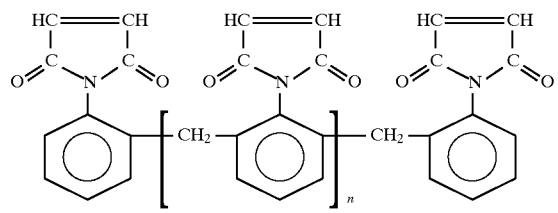

where n is at least 1.

6. A resin paste according to claim 1 wherein said liquid diamine contains siloxane groups.

7. A resin paste according to claim 6 wherein said liquid diamine has the general formula:

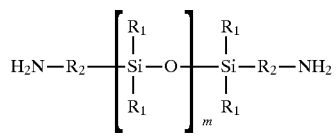

where $R_1$ is alkyl from $C_1$ to $C_4$ or vinyl, $R_2$ is alkylene from $C_1$ to $C_4$, and m is 7 to 200.

8. A resin paste according to claim 7 wherein $R_1$ is methyl, $R_2$ is n-propylene, and m is 9 to 50.

9. A resin paste according to claim 1 wherein said liquid diamine has about 20 to about 40 carbon atoms and no siloxane groups.

10. A resin paste according to claim 9 wherein said liquid diamine is a 36 carbon aliphatic diamine with two terminal primary amine groups.

11. A resin paste according to claim 1 wherein said liquid diamine is a mixture of about 10 to about 90 mole percent siloxane-containing diamine and about 10 to about 90 mole percent non-siloxane-containing diamine that has 20 to 40 carbon atoms.

12. A method of bonding two surfaces together comprising applying a resin paste according to claim 1 to one of said surfaces, pressing the other of said surfaces against said resin paste, and heating said resin paste to cure it.

13. A method of bonding sealing an object comprising applying a resin paste according to claim 1 to said object and heating said resin paste to cure it.

14. A resin paste according to claim 1 which contains about 70 to about 80 wt % of a filler selected from the group consisting of silica, silver, alumina, and aluminum nitride, and mixtures thereof.

15. A resin paste according to claim 1 which contains about 1 to about 5 wt % of fumed silica as a thickener.

16. A resin paste according to claim 1 which contains about 0.1 to about 0.5 wt % of a polymeric siloxane defoamer.

17. A resin paste according to claim 1 which contains about 0.1 to about 1 wt % of 3-aminopropyltriethoxysilane as a coupling agent.

18. A resin paste according to claim 1 which contains about 1 to about 5 wt % of a solid epoxy.

19. A resin paste comprising (A) a solid bismaleimide;

(B) liquid aliphatic primary diamine having a boiling point greater than 100° C., where the molar ratio of said bismaleimide to said diamine is about 1 to about 3 and the weight ratio of said diamine to said bismaleimide is about 1.5 to about 3, selected from the group consisting of siloxane-containing diamines, non-siloxane-containing diamines that have 20 to 40 carbon atoms, and mixtures thereof;

(C) up to about 80 wt % of a filler;

(D) up to about 6 wt % of a thickener;

(E) up to about 1 wt % of a defoamer;
(F) up to about 5 wt % of a coupling agent; and
(G) up to about 10 wt % of a solid epoxy.

20. A resin paste comprising
(A) a solid maleimide having the general formula

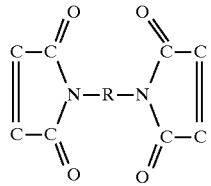

or

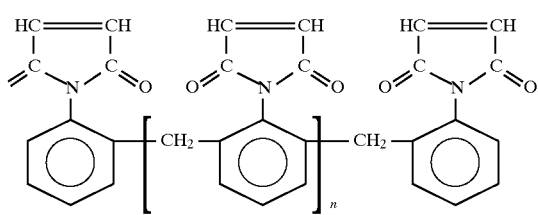

where R is aryl from $C_2$ to $C_{30}$ and n is at least 1;

(B) liquid aliphatic primary diamine having a boiling point greater than 100° C., where the molar ratio of said maleimide to said diamine is about 1 to about 2 and the weight ratio of said diamine to said maleimide is about 2 to about 3, where said liquid diamine comprises about 10 to about 90 mole % of a liquid siloxane-containing diamine having the general formula:

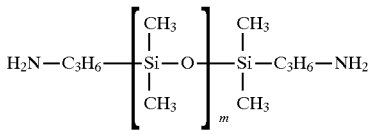

and about 10 to about 90 mole % of a non-siloxane-containing diamine that has 20 to 40 carbon atoms, where m is 10 to 50;
(C) up to about 80 wt % of a filler;
(D) up to about 6 wt % of a thickener;
(E) up to about 1 wt % of a defoamer;
(F) up to about 5 wt % of a coupling agent; and
(G) up to about 10 wt % of a solid epoxy.

* * * * *